United States Patent
Oyama et al.

(10) Patent No.: US 7,851,946 B2
(45) Date of Patent: Dec. 14, 2010

(54) SWITCHING POWER SUPPLY AND ELECTRONIC APPARATUS EMPLOYING THE SAME

(75) Inventors: Manabu Oyama, Kyoto (JP); Hiroaki Ando, Kyoto (JP); Daisuke Uchimoto, Kyoto (JP)

(73) Assignee: Rohm Co., Ltd. (JP)

( * ) Notice: Subject to any disclaimer, the term of this patent is extended or adjusted under 35 U.S.C. 154(b) by 737 days.

(21) Appl. No.: 11/664,963

(22) PCT Filed: Oct. 14, 2005

(86) PCT No.: PCT/JP2005/018961

§ 371 (c)(1),
(2), (4) Date: Apr. 19, 2007

(87) PCT Pub. No.: WO2006/043479

PCT Pub. Date: Apr. 27, 2006

(65) Prior Publication Data

US 2008/0088179 A1    Apr. 17, 2008

(30) Foreign Application Priority Data

Oct. 19, 2004    (JP)    ............... 2004-304807

(51) Int. Cl.
H02M 3/06    (2006.01)
(52) U.S. Cl. ........................ 307/109; 363/60
(58) Field of Classification Search ............... 327/536; 363/60, 59; 307/105, 109, 110
See application file for complete search history.

(56) References Cited

U.S. PATENT DOCUMENTS 5,262,934 A * 11/1993 Price .................... 363/60

7,511,977 B2 * 3/2009 Oyama et al. ............... 363/62

FOREIGN PATENT DOCUMENTS

| JP | 6-165482 | 6/1994 |
|---|---|---|
| JP | 06-165482 | 6/1994 |
| JP | 2001-258241 | 9/2001 |

(Continued)

OTHER PUBLICATIONS

International Search Report for PCT/JP2005/018961 dated Dec. 13, 2005.

(Continued)

*Primary Examiner*—Jared J Fureman
*Assistant Examiner*—Daniel Cavallari
(74) *Attorney, Agent, or Firm*—Cantor Colburn LLP

(57) ABSTRACT

In a switching power supply apparatus, an input voltage Vin applied to an input terminal is output from a first output terminal and a second output terminal after boosting or inverting of the voltage Vin. When a first and a fourth switches are turned on, a flying capacitor is charged. When a second and a fifth switches are turned on, charges charged in the flying capacitor are transferred to a first output capacitor. When a third and a fifth switches are turned on, charges charged in the flying capacitor are transferred to a second output capacitor. A voltage Vin×2 double the input voltage Vin is output from the first output terminal as a first output voltage Vout1, and a voltage −Vin obtained by inverting the input voltage is output from the second output terminal as a second output voltage.

4 Claims, 10 Drawing Sheets

FOREIGN PATENT DOCUMENTS

| | | |
|---|---|---|
| JP | 2004-64937 | 2/2004 |
| JP | 2004-229440 | 8/2004 |

OTHER PUBLICATIONS

International Preliminary Report on Patentability for PCT/JP2005/018961 dated Apr. 24, 2007.

International Search Report for International Application No. PCT/JP2005/018961 with English translation mailed Dec. 13, 2005.

International Preliminary Report on Patentability for International Application No. PCT/JP2005/018961 with English translation dated Apr. 24, 2007.

* cited by examiner

1000

SWITCHING POWER SUPPLY AND ELECTRONIC APPARATUS EMPLOYING THE SAME

CROSS REFERENCE TO RELATED APPLICATIONS

This is a U.S. national stage of application No. PCT/JP2005/018961, filed on 14 Oct. 2005. Priority under 35 U.S.C. §119(a) and 35 U.S.C. §365(b) is claimed from Japanese Application No. 2004-304807, filed 19 Oct. 2004, the disclosure of which is also incorporated herein by reference.

FIELD OF THE INVENTION

The present invention relates to a switching power supply apparatus of a charge pump type.

DESCRIPTION OF THE RELATED ART

In small-sized information terminals such as cellular telephones and personal digital assistants (PDAs) in recent years, there has been included a device, such as a light emitting diode (LED) used for a liquid crystal back light, wherein the device requires a voltage higher than the output voltage of a battery. For example, a lithium-ion battery has been used in most of the above small-sized information terminals, and the output voltage of the battery is usually about 3.5 volts, and about 4.2 volts even when the battery is fully charged. But a voltage higher than the voltage of the battery is required for the driving voltage of the LED. When a voltage higher than the voltage of the battery is required as described above, the voltage of the battery is boosted by use of a booster circuit of a switched capacitor method and the like to obtain a voltage required for driving a load circuit such as the LED. Moreover, there is a case in which a negative power supply is required in such a small-sized information terminal, and a desired negative voltage is obtained by use of a voltage inverter circuit of a switched capacitor method even in the above case (refer to a patent document 1).

Patent Document 1: Japanese Patent Application Laid-Open No. 2001-258241

Here, a case in which a load circuit requiring a voltage higher than the battery voltage, and a load circuit requiring a negative voltage are driven at the same time in a certain small-sized information terminal device will be considered. In the above case, there is considered a method in which a booster circuit and a voltage inverter circuit are installed for each of the load circuits, in order to supply a voltage to each of the load circuits. However, a flying capacitor is required to be installed for each of the booster circuit and the voltage inverter circuit according to the above method. As the capacitance of the flying capacitor is generally large, the capacitor is formed as an external component in most cases. Accordingly, when the capacitors are provided for each of the power supply devices, the number of components is increased to cause a state in which a request for reduction in the size and the cost of the small-sized information terminal device is not satisfied.

SUMMARY OF THE INVENTION

The present invention has been made, considering the above circumstances, and its general purpose is to supply a switching power supply apparatus by which a plurality of voltages may be output by a simple circuit configuration.

An embodiment of the present invention is a switching power supply apparatus which generates and outputs two different voltages of a first and second output voltages from one input voltage. This switching power supply apparatus includes: a flying capacitor; a first output capacitor; a second output capacitor; and a control unit which control the charged states of the three capacitors. The control unit divides time into a first charging period in which the flying capacitor is charged by the input voltage, a second charging period in which the first output capacitor is charged by a voltage which appears at one end in the flying capacitor when the input voltage is applied to the other low-potential-side terminal in the flying capacitor, and a third charging period in which the second output capacitor is charged by a voltage which appears at one end in the flying capacitor when the other high-potential-side terminal in the flying capacitor is connected to a fixed potential terminal, the charging periods are repeated, and the first and second output voltages are output from the first and second output capacitors, respectively.

According to the above embodiment, a voltage double the input voltage may be generated as the first output voltage, and a voltage obtained by inverting the input voltage may be generated as the second output voltage. Furthermore, the circuit configuration may be simplified by common use of the flying capacitor.

Another embodiment of the present invention is a switching power supply apparatus which generates and outputs two different voltages of a first and second output voltages from a first and second input voltages. This switching power supply apparatus includes: a flying capacitor; a first output capacitor; a second output capacitor; and a control unit by which the charged states of the three capacitors are controlled. The control unit divides time into a first charging period in which the flying capacitor is charged by the first input voltage, a second charging period in which the first output capacitor is charged by a voltage which appears at one end in the flying capacitor when the second input voltage is applied to the other low-potential-side terminal in the flying capacitor, and a third charging period in which the second output capacitor is charged by a voltage which appears at one end in the flying capacitor when the other high-potential-side terminal in the flying capacitor is connected to a fixed potential terminal, the charging periods are repeated, and the first and second output voltages are output from the first and second output capacitors, respectively.

According to the above embodiment, the sum voltage of the first and second input voltages may be generated as the first output voltage, and a voltage obtained by inverting the input voltage may be generated as the second output voltage. Furthermore, the circuit configuration may be simplified by common use of the flying capacitor.

The control unit may control the charging states of the three capacitors in a cyclic manner in which the first charging period, the second charging period, the first charging period, and the third charging period are repeated in this order.

Further another embodiment of the present invention is also a switching power supply apparatus which generates and outputs two different voltages of a first and second output voltages from one input voltage. This switching power supply apparatus includes: a flying capacitor; a first output capacitor which is provided between a first output terminal, from which the first output voltage is output, and a fixed potential terminal; a second output capacitor which is provided between a second output terminal, from which the second output voltage is output, and a fixed potential terminal; a first switch provided between one end of the flying capacitor and an input terminal to which the input voltage is applied; a second switch provided between the other end of the flying capacitor and the input terminal; a third switch provided between the one end of the flying capacitor and a fixed potential terminal; a fourth switch provided between the other end of the flying capacitor and a fixed potential terminal; a fifth switch provided between the one end of the flying capacitor and the first output terminal; a sixth switch provided between the other end of the flying capacitor and the second output terminal; and a control unit which performs on-off control of the first through the sixth switches.

According to the above embodiment, there is common use of one flying capacitor in the switching power supply apparatus which generates two output voltages. Furthermore, the first output capacitor and the second output capacitor are charged by different voltages from each other by on-off control of a plurality of switches by the control unit. As a result, a voltage double the input voltage may be output from the first output capacitor, and a voltage obtained by inverting the input voltage may be output from the second output capacitor.

The control unit may divide time into: a first charging period in which the first switch and the fourth switch are turned on, and the flying capacitor is charged by the input voltage; a second charging period in which the second switch and the fifth switch are turned on, and a voltage approximately two times the input voltage is output from the first output terminal; and a third charging period in which the third switch and the sixth switch are turned on, and a voltage which is obtained by inverting the input voltage, is output from the second output terminal, and the charging periods may be repeated.

As the first to sixth switches are on-off-controlled by dividing time and charges supplied to the flying capacitor are alternately supplied to the first and second output capacitors, a voltage double the input voltage may be output from the first output capacitor, and at the same time, a voltage obtained by inverting the input voltage may be output from the second output capacitor.

Another embodiment of the present invention is also a switching power supply apparatus which generates and outputs two different voltages of a first and second output voltages from a first and second input voltages. This switching power supply apparatus includes: a flying capacitor; a first output capacitor which is provided between a first output terminal, from which the first output voltage is output, and a fixed potential terminal; a second output capacitor which is provided between a second output terminal, from which the second output voltage is output, and a fixed potential terminal; a first switch provided between one end of the flying capacitor and a first input terminal to which the first input voltage is applied; a second switch provided between the other end of the flying capacitor and a second input terminal to which the second input voltage is applied; a third switch provided between the one end of the flying capacitor and a fixed potential terminal; a fourth switch provided between the other end of the flying capacitor and a fixed potential terminal; a fifth switch provided between the one end of the flying capacitor and the first output terminal; a sixth switch provided between the other end of the flying capacitor and the second output terminal; and a control unit which performs on-off control of the first through the sixth switches.

According to the above embodiment, the first output capacitor and the second output capacitor are charged by different voltages from each other by common use of one flying capacitor in the switching power supply apparatus which generates two output voltages, and, further, by on-off control of a plurality of switches by the control unit. As a result, the sum voltage of the first input voltage and the second input voltage may be output from the first output capacitor, and a voltage obtained by inverting the input voltage may be output from the second output capacitor.

The control unit may divide time into: a first charging period in which the first switch and the fourth switch are turned on, and the flying capacitor is charged by the first input voltage; a second charging period in which the second switch and the fifth switch are turned on, and the sum voltage of the first input voltage and the second input voltage is output from the first output terminal; and a third charging period in which the third switch and the sixth switch are turned on, and a voltage which is obtained by inverting the first input voltage, is output from the second output terminal, and the charging periods may be repeated.

The control unit may perform on-off control of the first through the sixth switches in a cyclic manner in which the first charging period, the second charging period, the first charging period, and the third charging period are repeated in this order.

The switching power supply apparatus according to any one of the above-described embodiments may further include: a control transistor which is provided between the first output terminal and one end of the flying capacitor, and is connected in series with the fifth switch; and an error amplifier by which an error between the first output voltage and a predetermined reference voltage is amplified, and the amplified error is applied to the control terminal of the control transistor.

A control terminal is a gate terminal in a field effect transistor (FET), and is a base terminal in a bipolar transistor. The first output voltage may be stabilized by a configuration in which a regulating function is added to an error amplifier and a control transistor.

The switching power supply apparatus according to any one of the above-described embodiments may further includes: a control transistor which is provided between the fixed potential terminal and one end of the flying capacitor, and is connected in series with the third switch; and an error amplifier by which an error between the second output voltage and a predetermined reference voltage is amplified, and the amplified error is applied to the control terminal of the control transistor.

The second output voltage may be stabilized by giving the regulation function to the error amplifier and the control transistor.

Further another embodiment of the present invention is a method for driving a switching power supply apparatus. The method for driving a switching power supply apparatus is a method for driving a switching power supply apparatus by which two different voltages of the first and second output voltages are generated from one input voltage for output. According to this driving method, time is divided into a first charging period in which the flying capacitor is charged by the input voltage, a second charging period in which the first output capacitor is charged by a voltage which appears at one end in the flying capacitor when the input voltage is applied to the other low-potential-side terminal in the flying capacitor, and a third charging period in which the second output capacitor is charged by a voltage which appears at one end in the flying capacitor when the other high-potential-side terminal in the flying capacitor is connected to a fixed potential terminal, and the charging periods are repeated in a switching power supply apparatus including a flying capacitor; a first output capacitor and a second output capacitor.

According to the above embodiment, the switching power supply apparatus which includes one flying capacitor has a configuration in which the first and second output voltages may be output from the first and second output capacitors, respectively, wherein the first and second output voltages are different from each other.

Further another embodiment of the present invention relates to a switching power supply apparatus. This switching power supply apparatus includes: the switching power supply apparatus according to any one of the above-described embodiments, which is provided as a first charge pump circuit; a second charge pump circuit, which includes a second flying capacitor and a third output capacitor, and by which the first output voltage output from the first charge pump circuit is converted into a predetermined voltage, and is output as a third output voltage. The switching frequency of the second charge pump circuit is set half the switching frequency of the first charge pump circuit.

The switching operation of the first charge pump circuit may be controlled according to a first clock signal, and at the same time, the switching operation of the second charge pump circuit may be controlled according to a second clock signal, which is obtained by frequency division of the first clock signal.

According to the embodiment, a frequency with which the first output capacitor is charged in the first charge pump circuit may be set equal to a frequency with which the second flying capacitor is charged in the second charge pump circuit.

There may be a configuration in which the first charge pump circuit performs switching operation in a cyclic manner, in which the first charging period, the second charging period, the first charging period, and the third charging period are repeated in this order, and, on the other hand, the second charge pump circuit charges the second flying capacitor during the second charging period and the subsequent first charging period, and at the same time, charges the third output capacitor during the third charging period and the subsequent first charging period.

Moreover, there may be a configuration in which the first charge pump circuit performs switching operation in a cyclic manner, in which the first charging period, the second charging period, the first charging period, and the third charging period are repeated in this order, and, on the other hand, the second charge pump circuit charges the second flying capacitor during the first charging period and the second charging period following the first charging period, and at the same time, charges the third output capacitor during the first charging period and the third charging period following the first charging period.

In this case, fluctuations in the first output voltage may be suppressed because the period in which the first output capacitor is charged in the first charge pump circuit, and the period in which the second flying capacitor is charged in the second charge pump circuit may be synchronously controlled.

The second charge pump circuit may be a charge pump circuit of an inverting type, which inverts the first output voltage for output.

Further another embodiment of the present invention relates to electronic equipment. This electronic equipment includes: the above-described switching power supply apparatus; and a plurality of loads driven by a voltage output from the switching power supply apparatus.

According to the embodiment, two or more different output voltages including a voltage higher than the battery voltage may be supplied to a plurality of loads.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

Figure 1:
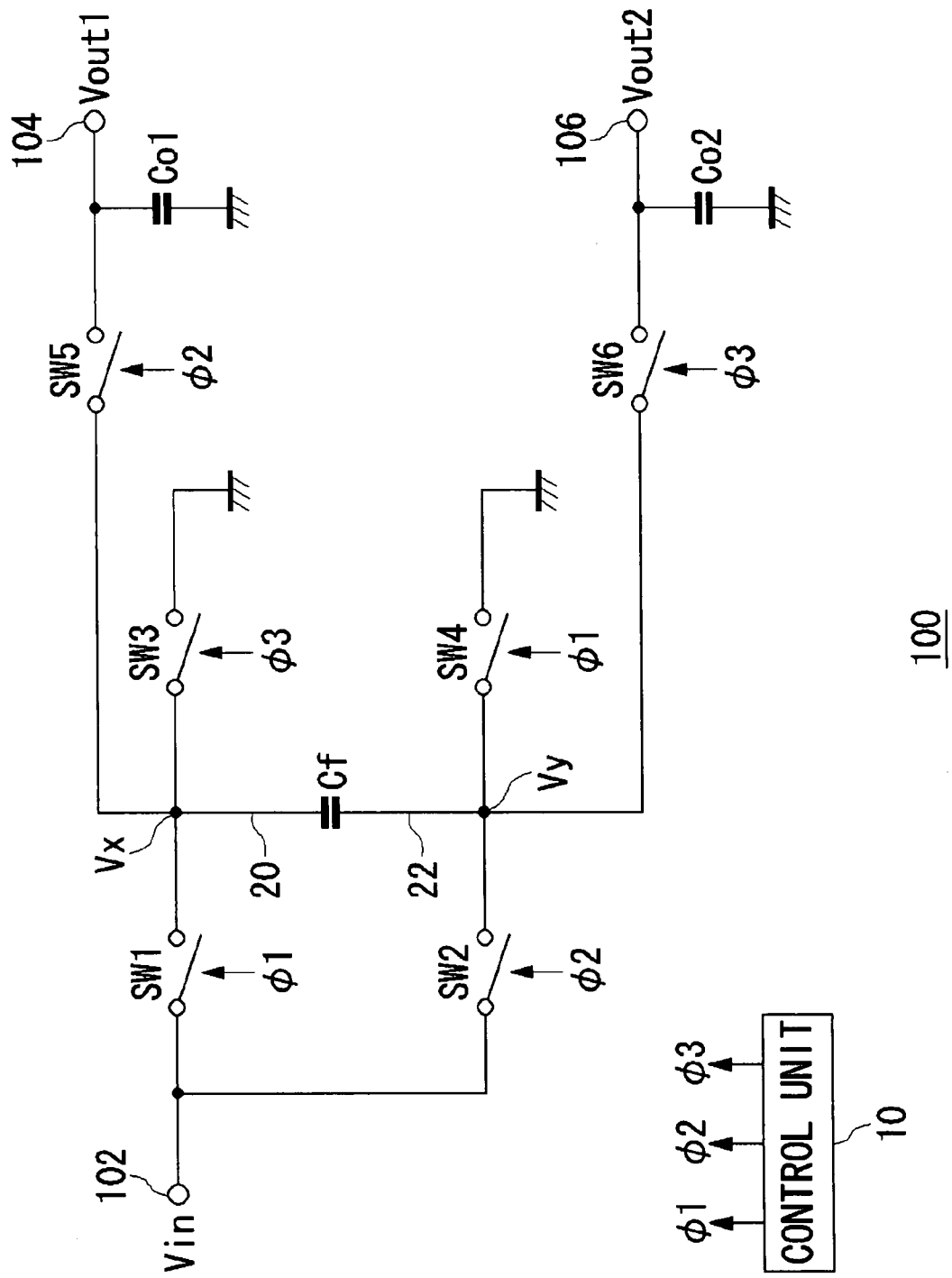
FIG. 1 is a circuit diagram showing a configuration of a switching power supply apparatus according to a first embodiment.

FIG. 1 is a circuit diagram showing a configuration of a switching power supply apparatus 100 according to a first embodiment of the present invention. The switching power supply apparatus 100 is provided with an input terminal 102, a first output terminal 104, and a second output terminal 106 as input-output terminals, and an input voltage Vin applied to the input terminal 102 is output from the first output terminal 104 and the second output terminal 106 after boosting or inverting of the voltage Vin.

This switching power supply apparatus 100 includes: a flying capacitor Cf; a first switch SW1 through a sixth switch SW6; a first output capacitor Co1; a second output capacitor Co2; and a control unit 10.

The first output capacitor Co1 is provided between the first output terminal 104 and a ground terminal as a fixed potential, and supplies charges to a load circuit connected to the first output terminal 104.

Similarly, the second output capacitor Co2 is provided between the second output terminal 106 and a ground terminal, and supplies charges to a load circuit connected to the second output terminal 106.

The flying capacitor Cf is charged by the input voltage Vin applied to the input terminal 102 for charge transfer to the first output capacitor Co1 or the second output capacitor Co2 after temporary charge storage. It is assumed for distinction of electrodes of the flying capacitor Cf that one end of the electrodes is expressed by 20, the other end is 22, a voltage appearing at the one end 20 is Vx, and a voltage appearing at the other end 22 is Vy.

Each of the first switch SW1 through the sixth switch SW6 is provided between two components among the flying capacitor Cf, the first output capacitor Co1, the second output capacitor Co2, and the ground terminals for switching the charge and discharge state of each capacitor. Transistors such as metal oxide semiconductor field effect transistors (MOSFETs) may form the above first switch SW1 through the sixth switch SW6, and on-off control may be performed by voltages applied to the gate terminals of the MOSFETs.

The first switch SW1 is provided between the one end 20 of the flying capacitor Cf and the input terminal 102 to which the input voltage Vin is applied. Moreover, the fourth switch SW4 is provided between the other end 22 of the flying capacitor Cf and a ground terminal.

When the first switch SW1 and the fourth switch SW4 are turned on, the other end 22 of the flying capacitor Cf is grounded, and the input voltage Vin is applied to the one end 20 to cause a state in which the flying capacitor Cf is charged by the input voltage Vin. While the flying capacitor Cf is charged, a potential difference between the one end 20 and the other one 22 is equal to the input voltage Vin. Accordingly, the following relation holds true: Vx=Vy+Vin. It is assumed that a period, in which the first switch SW1 and the fourth switch SW4 are turned on, and the flying capacitor Cf is charged by the input voltage Vin, is a first charging period φ1.

The second switch SW2 is provided between the other end 22 of the flying capacitor Cf and the input terminal 102. Moreover, the fifth switch SW5 is provided between the one end 20 of the flying capacitor Cf and the first output terminal 104.

When the second switch SW2 is turned on, the other end 22 of the flying capacitor Cf is connected to the input terminal 102, and the voltage Vy becomes equal to the input voltage Vin. As a result, the following relation holds true with regard to the voltage of the one end 20 of the flying capacitor Cf: Vx=Vy+Vin=2×Vin, that is, a voltage two times the input voltage Vin appears.

At this time, the fifth switch SW5 is simultaneously turned on to cause a state in which the one end 20 of the flying capacitor Cf is connected to the first output terminal 104 to charge the first output capacitor Co1, which is connected to between the first output terminal 104 and the ground terminal, by the voltage Vx. As a result, a voltage equal to the voltage Vx at the one end 20 of the flying capacitor Cf, that is, a voltage two times the input voltage Vin is output from the first output terminal 104 as the first output voltage Vout1. It is assumed that a period, in which the second switch SW2 and the fifth switch SW5 are turned on, and the first output capacitor Co1 is charged by the voltage Vx, is a second charging period φ2.

The third switch SW3 is provided between the one end 20 of the flying capacitor Cf and a ground terminal. Moreover, the sixth switch SW6 is provided between the other end 22 of the flying capacitor Cf and the second output terminal 106.

When the third switch SW3 is turned on, the one end 20 of the flying capacitor Cf is connected to the ground terminal, and the voltage Vx becomes equal to the ground potential. When the flying capacitor Cf is charged by the input voltage Vin, the following relation holds true: Vy=Vx−Vin. Accordingly, the following relation holds true with regard to the voltage at the other end 22 of the flying capacitor Cf: Vy=0−Vin=−Vin, that is, a voltage which obtained by inverting the input voltage Vin appears.

At this time, the sixth switch SW6 is simultaneously turned on to cause a state in which the other end 22 of the flying capacitor Cf is connected to the second output terminal 106 to charge the second output capacitor Co2, which is provided between the second output terminal 106 and the ground terminal, by the voltage Vy. As a result, a voltage which obtained by inverting the input voltage Vin is output from the second output terminal 106 as the second output voltage Vout2.

It is assumed that a period, in which the third switch SW3 and the sixth switch SW6 are turned on, and the second output capacitor Co2 is charged by the voltage Vy, is a third charging period φ3.

Figure 2:
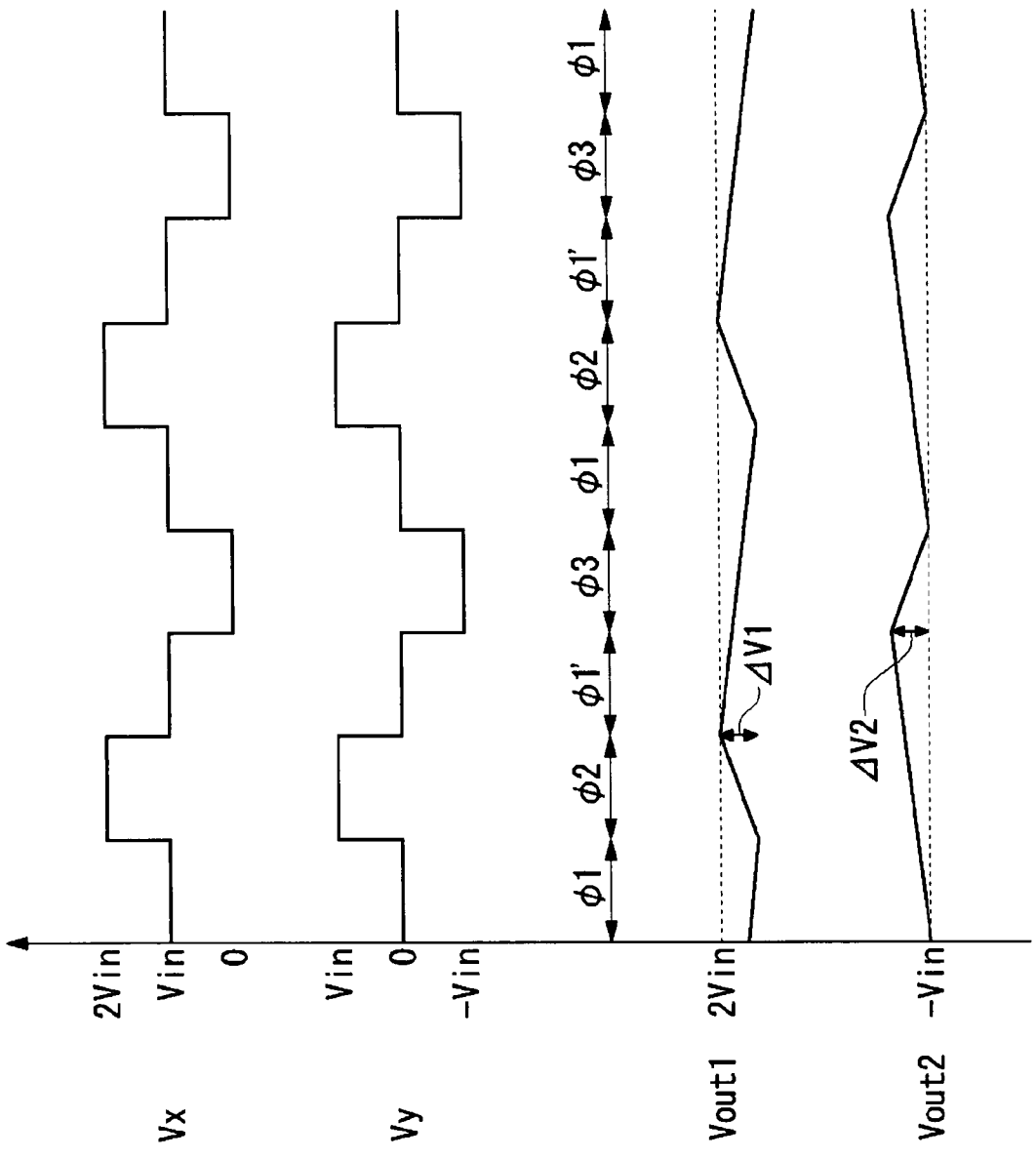
FIG. 2 is a time chart showing time waveforms of voltages at each terminal of the switching power supply apparatus in FIG. 1.

The operation of the switching power supply apparatus 100 with the above-described configuration will be explained, referring to FIG. 2. FIG. 2 is a time chart showing time waveforms of voltages at each terminal of the switching power supply apparatus 100 in FIG. 1.

The control unit 10 switches among the first charging period φ1 in which the first switch SW1 and the fourth switch SW4 are simultaneously turned on, and the flying capacitor Cf is charged, the second charging period φ2 in which the second switch SW2 and the fifth switch SW5 are turned on, and the first output capacitor Co1 is charged, and the third charging period φ3 in which the third switch SW3 and the sixth switch SW6 are turned on, and the second output capacitor Co2 is charged.

As shown in FIG. 2, time is divided in such a way that the first charging period φ1 is inserted between the second charging period φ2 and the third charging period φ3, and the charging periods is repeated. A distinction is made for explanation, that is, the first charging period during the transition from the second charging period φ2 to the third charging period φ3 is assumed to be φ1, and, conversely, the first charging period during the transition from the second charging period φ3 to the third charging period φ2 is assumed to be φ1'.

The first switch SW1 and the fourth switch SW4 are turned on during the first charging period φ1. As a result, the following relation holds true with regard to the voltage at the one end 20 of the flying capacitor Cf: Vx=Vin, and the following relation is obtained for the voltage at the other end 22: Vy=0. At this time, the flying capacitor Cf is charged by the input voltage Vin for charge storage.

Then, the charging period is switched to the second one φ2 by the control unit 10. As the second switch SW2 is turned on during the second charging period φ2, the following relation holds true with regard to the voltage at the other end 22 of the flying capacitor Cf: Vy=Vin. As the flying capacitor Cf is charged by the input voltage Vin during the last-minute first charging period φ1, the following relation is obtained for the voltage at the one end 20 of the flying capacitor Cf: Vx=Vy+Vin=Vin+Vin=2×Vin. As the fifth switch SW5 is also turned on during the second charging period φ2, the first output capacitor Co1 is charged by the voltage Vx. At this time, charges stored in the flying capacitor Cf are transferred to the first output capacitor Co1. Accordingly, a potential difference (Vx−Vy) between the one end 20 and the other one 22 of the flying capacitor Cf becomes smaller than Vin.

Then, the charging period becomes the first charging period φ1' again to cause a state in which the first switch SW1 and the fourth switch SW4 are turned on. Accordingly, the voltage between the both ends of the flying capacitor Cf is charged again by the input voltage Vin.

Then, the charging period becomes the third charging period φ3 to cause a state in which the third switch SW3 is turned on, and the one end 20 of the flying capacitor Cf is grounded. Accordingly, the following relation holds true: Vx=0. As the flying capacitor Cf is charged by the input voltage Vin during the last-minute first charging period φ1', the following relation is obtained for the voltage at the other end 22: Vy=Vx−Vin=−Vin. At this time, the sixth switch SWG is also turned on to cause a state in which the second output capacitor Co2 is charged by the voltage (Vy=−Vin) of the other end 22 of the flying capacitor Cf.

As described above, the first output capacitor Co1 and the second output capacitor Co2 are charged by 2×Vin, −Vin, respectively, by repeating the three charging periods φ1, φ2, φ1', and φ3.

The voltage of the first output capacitor Co1 appears at the first output terminal 104 as the first output voltage Vout1. The first output capacitor Co1 is charged during the second charging period φ2, and is discharged by a current flowing in the load circuit connected to the second output terminal 106 during the first and third charging periods φ1 and φ3. Accordingly, the first output voltage Vout1 is raised to 2×Vin during the second charging period φ2, and then, is gradually reduced by a current flowing in the load circuit during the periods of φ1', φ3, and φ1, as shown in FIG. 2.

Similarly, the voltage of the second output capacitor Co2 appears at the second output terminal 106 as the second output voltage Vout2. The second output capacitor Co2 is charged during the third charging period φ3, and is discharged by a current flowing in the load circuit during the first and second charging periods φ1 and φ2. Accordingly, the second output voltage Vout2 is decreased to −Vin during the third charging period φ3, and then, is gradually raised by a current flowing in the load circuit during the periods of φ1, φ2, and φ1', as shown in FIG. 2.

Here, FIG. 2 is an enlarged view of the first output voltage Vout1 and the second output voltage Vout2 plotted as the vertical axis.

As described above, according to the switching power supply apparatus 100 of the present embodiment, a double voltage and an inverting voltage are generated from the input voltage Vin applied to the input terminal 102, and are simultaneously output from the first and second output terminals 104 and 106, respectively, with a simple configuration.

In this switching power supply apparatus 100, according to a configuration in which the flying capacitor Cf is used by dividing time to generate two output voltages, one capacitor may be eliminated, in comparison with a case in which two switching power supply apparatuses are used, while one device generates a double voltage and the other device generates an inverting voltage. Moreover, the circuit may be simplified because the control unit 10 may be also used commonly for the devices.

When load currents flowing in the load circuits, which are connected respectively to the first output terminal 104 and the second output terminal 106, is small, the first charging period φ1 or φ1' may be eliminated in the time chart shown in FIG. 2 because reduction in the output voltages Vout1 and Vout2 is small. Moreover, the sequence of the first charging period φ1 through the third charging period φ3 may be changed according to the driving states of the loads.

Cases in which the double voltage is output from the first output terminal 104, and, simultaneously, the inverting voltage is output from the second output terminal 106 in FIG. 2 have been explained above, but only either of the voltages may be configured to be output. For example, when only the double voltage is required, only the first charging period φ1 and the second charging period may be repeated. Similarly, when only the inverting voltage is required, only the first charging period φ1 and the third charging period φ3 may be alternately repeated.

Second Embodiment

A switching power supply apparatus according to a second embodiment of the present invention has a configuration in which a regulating function for stabilizing an output voltage is added to the switching power supply apparatus 100 according to the first embodiment.

Figure 3:
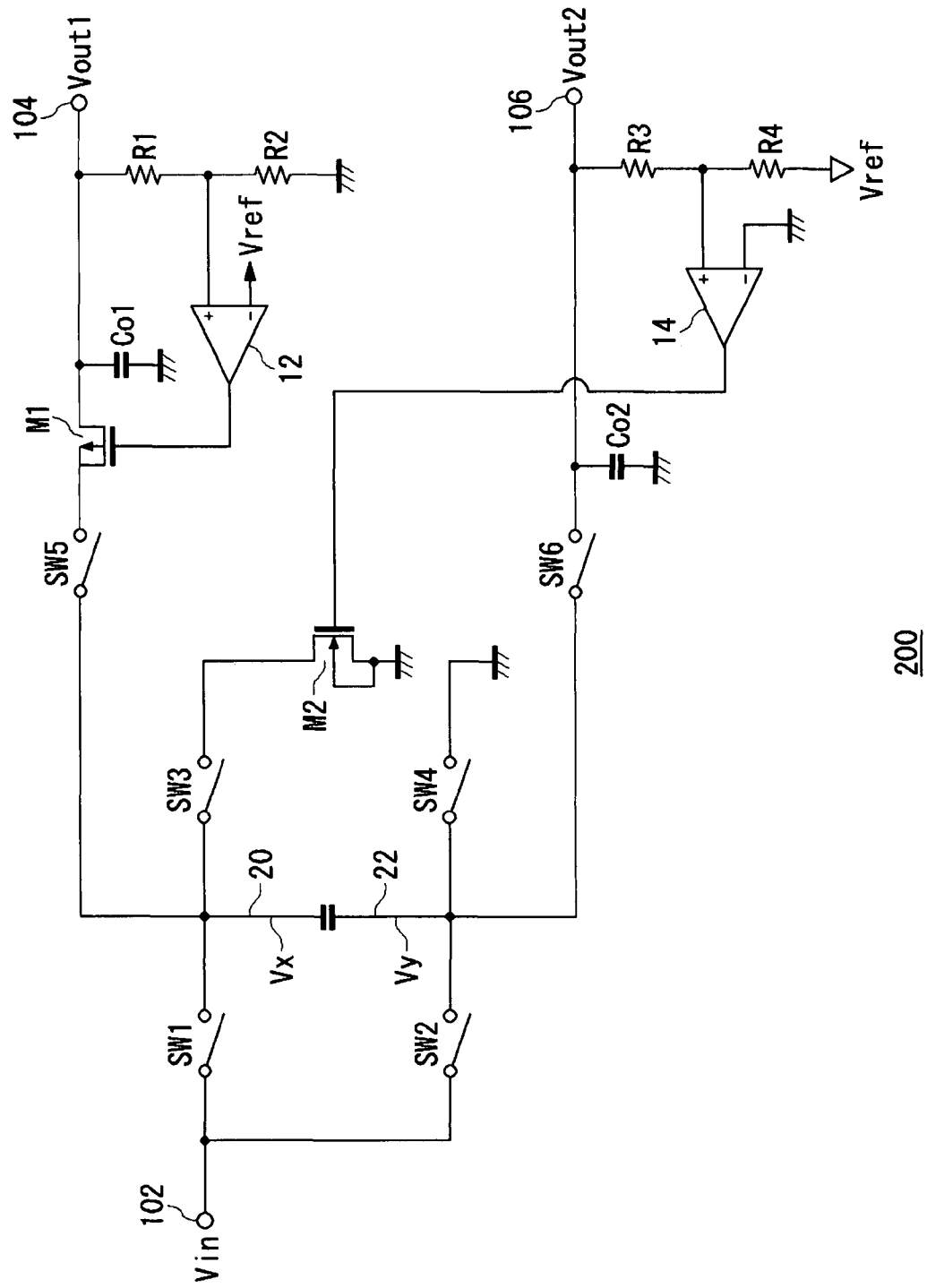
FIG. 3 is a circuit diagram showing a configuration of a switching power supply apparatus according to a second embodiment.

FIG. 3 is a circuit diagram showing a configuration of a switching power supply apparatus 200 according to the second embodiment. Hereinafter, same or equivalent components in the following drawings are denoted by the same reference numerals, and description will not be repeated as appropriate.

The switching power supply apparatus 200 includes, in addition to the switching power supply apparatus 100 according to the first embodiment: a first feedback resistor R1 through a fourth feedback resistor R4; a first error amplifier 12; a second error amplifier 14; a first control transistor M1; and a second control transistor M2.

The first and second feedback resistors R1 and R2, the first error amplifier 12, and the first control transistor M1 are provided for stabilizing a first output voltage Vout1.

A voltage (Vout1×R2/(R1+R2)) is input to a non-inverting input terminal of the first error amplifier 12 after resistor division of the first output voltage Vout1 by the first and second feedback resistors R1 and R2. Moreover, a reference voltage Vref is input to the inverting input terminal.

The first control transistor M1 is provided between a first output terminal 104 and one end 20 of a flying capacitor Cf, and is connected in series with a fifth switch SW5. The on-resistor of the first control transistor M1 is changed by controlling the gate voltage, and the transistor M1 has a function by which a charging voltage of a first output capacitor Co1 is adjusted during a second charging period φ2. The output of the first error amplifier 12 is connected to the gate terminal of this first control transistor M1.

Feedback control of the output voltage of the first error amplifier 12 is performed in such a way that the voltage applied to the non-inverting input terminal and that applied to the inverting input terminal are equal to each other. That is, the output of this first error amplifier 12 is configured to be adjusted in such a way that the following relation holds true: Vout1×R2/(R1+R2)=Vref. As a result, the first output voltage is stabilized in such a way that the following relation holds true: Vout1=Vref×(R1+R2)/R2. Here, the first output voltage Vout1 may be stabilized to a target value, without depending on load fluctuation and input voltage fluctuation, by setting the target value of the first output voltage Vout1 given by (Vref×(R1+R2)/R2) in such a way that the following relation is satisfied: Vref×(R1+R2)/R2<2×Vin−ΔV1. Here, ΔV1 is equivalent to a voltage reduction in the first output voltage Vout1 as shown in FIG. 2.

Similarly, the third and fourth feedback resistors R3 and R4, the second error amplifier 14, and the second control transistor M2 stabilize a second output voltage Vout2.

The second output voltage Vout1 and the reference voltage Vref are input to the non-inverting input terminal of the second error amplifier 14 after voltage division by the third and fourth feedback resistors R3 and R4. Moreover, the inverting input terminal is grounded.

The second control transistor M2 is provided between a ground terminal and the one end 20 of the flying capacitor Cf, and is connected in series with a third switch SW3. The output of the second error amplifier 14 is connected to the gate terminal of the second control transistor M2, and the second output voltage Vout2 is stabilized by changing the on-resistor.

As feedback control is performed even in the second error amplifier 14 in such a way that the voltage applied to the non-inverting input terminal and that applied to the inverting input terminal are equal to each other, the gate voltage of the second control transistor M2 is adjusted in such a way that the following relation is satisfied: 0=(R3×Vref+R4×Vout2)/(R3+R4). As a result, the second output voltage Vout2 approaches a target value given by −(R3/R4×Vref). The second output voltage Vout2 may be stabilized to this target value, without depending on load fluctuation and input voltage fluctuation, by setting the target value in such a way that the following relation is satisfied: −R3/R4×Vref>−Vin+ΔV2. Here, ΔV2 is equivalent to a voltage rise in the second output voltage Vout2 as shown in FIG. 2.

Thus, according to the switching power supply apparatus 200 of the second embodiment, fluctuations in the first output voltage Vout1 or the second output voltage Vout2 caused by load fluctuation and input voltage fluctuation, may be suppressed by adding the regulating function, and the target value determined by the reference voltage Vref and the feedback resistors R1 through R4 may be stabilized.

Third Embodiment

Figure 4:
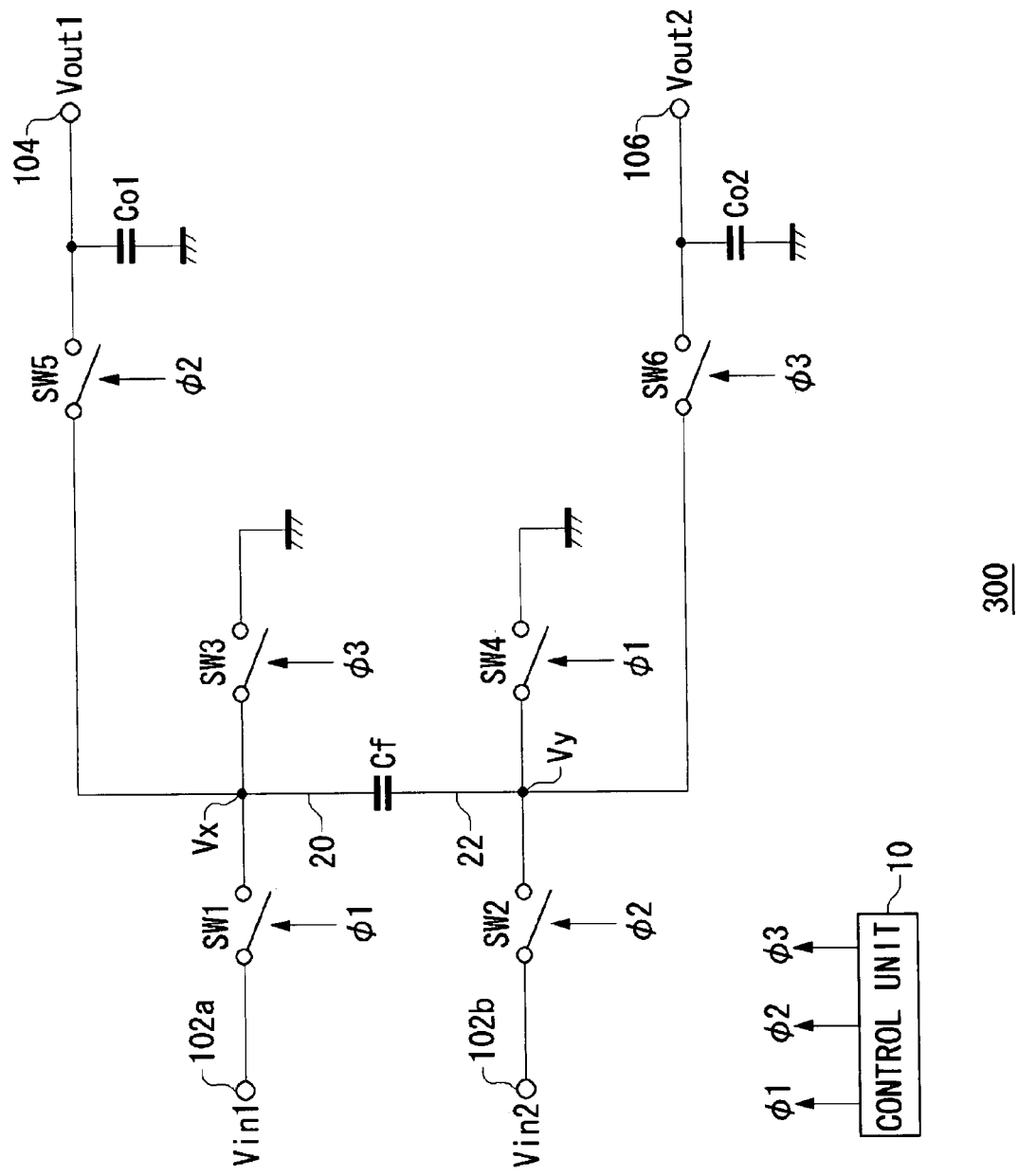
FIG. 4 is a circuit diagram showing a configuration of a switching power supply apparatus according to a third embodiment.

FIG. 4 is a circuit diagram showing a configuration of a switching power supply apparatus 300 according to a third embodiment. The switching power supply apparatus 300 according to the present embodiment generates and outputs two different voltages of a first output voltage Vout1 and a second output voltage Vout2 from a first input voltage Vin1 and a second input voltage Vin2. The first input voltage Vin1 and the second input voltage Vin2 are applied to a first input terminal 102a and a second input terminal 102b, respectively.

A second switch SW2 of the switching power supply apparatus 300 according to the present embodiment is provided between the other end of a flying capacitor Cf and the second input terminal 102b.

The operation of the switching power supply apparatus 300 according to the present embodiment is similar to that of the switching power supply apparatus 100. That is, a control unit 10 switches a first switch SW1 and a fourth switch SW4 to on position, and charges the flying capacitor Cf by the first input voltage Vin1 during a first charging period φ1.

The second switch SW2 and a fifth switch SW5 are turned on by the control unit 10, the second input voltage Vin2 is applied to a low-potential-side terminal 22 in the flying capacitor Cf, and a first output capacitor Co1 is charged by a voltage (Vx (=Vin2+Vin1)) appearing at the other end 20 during a second charging period φ2.

A third switch SW3 and a sixth switch SW6 are turned on by the control unit 10, the high-potential-side terminal 20 in the flying capacitor Cf is connected to a ground terminal, and a second output capacitor Co2 is charged by a voltage Vy (=−Vin1) appearing at the other end 22 during a third charging period 43. The control unit 10 controls the charging states of the flying capacitor Cf, the first output capacitor Co1, and the second output capacitor Co2 in a cyclic manner in which the first charging period φ1, the second charging period φ2, the first charging period φ1, and the third charging period φ3 are repeated in this order.

According to the switching power supply apparatus 200 of the present embodiment, the sum voltage of the first input voltage Vin1 and the second input voltage Vin2 is output from a first output terminal 104, and at the same time, the inverting voltage −Vin1 of the first input voltage Vin1 is output from a second output terminal 106.

Fourth Embodiment

Figure 5:
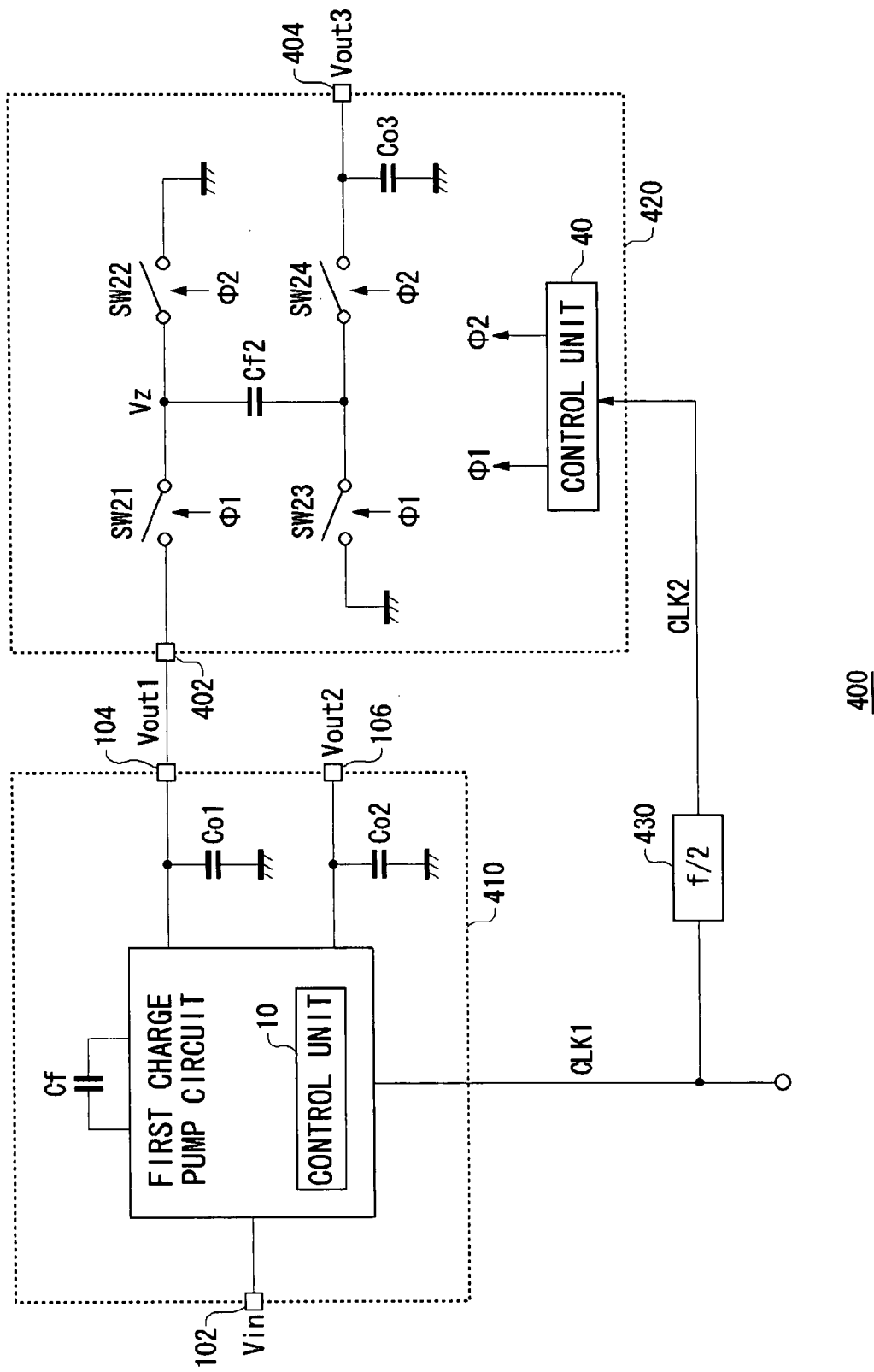
FIG. 5 is a circuit diagram showing a configuration of a switching power supply apparatus according to a fourth embodiment.

FIG. 5 is a circuit diagram showing a configuration of a switching power supply apparatus 400 according to a fourth embodiment. The switching power supply apparatus 400 according to the present embodiment is provided with: the switching power supply apparatus (called a first charging pump circuit 410 in the present embodiment) which is shown in FIG. 1, and is provided as a first charge pump circuit; a second charge pump circuit 420; and a frequency divider 430.

A first output voltage Vout1 is applied to an input terminal 402 of the second charge pump circuit 420 as an input voltage. In the present embodiment, the second charge pump circuit 420 is a charge pump circuit of an inverting type which inverts the first output voltage Vout1 for output, and a third output voltage Vout3 obtained by inverting the first output voltage Vout1 is output from an output terminal 404.

The second charge pump circuit 420 includes: a second flying capacitor Cf2; a third output capacitor Co3; switches SW21, SW22, SW23, and SW24, and a control unit 40.

The switch SW21 is provided between one end of the second flying capacitor Cf2 and the input terminal 402. Moreover, the switch SW22 is provided between the one end of the second flying capacitor Cf2 and a ground. The switch SW23 is provided between the other end of the second flying capacitor Cf2 and a ground, and the switch SW24 is provided between the other end of the second flying capacitor Cf2 and the output terminal 404. The third output capacitor Co3 is provided between the output terminal 404 and a ground.

The control unit 40 performs on-off control of the switches SW21 through SW24, according to a second clock signal CLK2. In a first state Φ1, the switches SW21 and SW23 are turned on, and the switches SW22 and SW24 are turned off according to control of the control unit 40 to charge the second flying capacitor Cf2 by the first output voltage Vout1. Moreover, in a second state Φ2, the switches SW21 and SW23 are turned off, and the switches SW22 and SW24 are turned on according to control of the control unit 40 to transfer charges stored in the second flying capacitor Cf2 in the first state Φ1 to the third output capacitor Co3 for charging the third output capacitor Co3.

The third output voltage Vout3 (=−Vout1) which is obtained by inverting the first output voltage Vout1 is output by alternately repeating the first state Φ1 and the second state Φ2 by the control unit 40 is output.

The switching operation of the first charge pump circuit 410 is controlled according to a first clock signal CLK1 input from the outside. The frequency divider 430 outputs the second clock signal CLK2 whose frequency is half of that of the first clock signal CLK1. As a result, the switching frequency of the second charge pump circuit 420 is set half the switching frequency of the first charge pump circuit 410.

Figure 6:
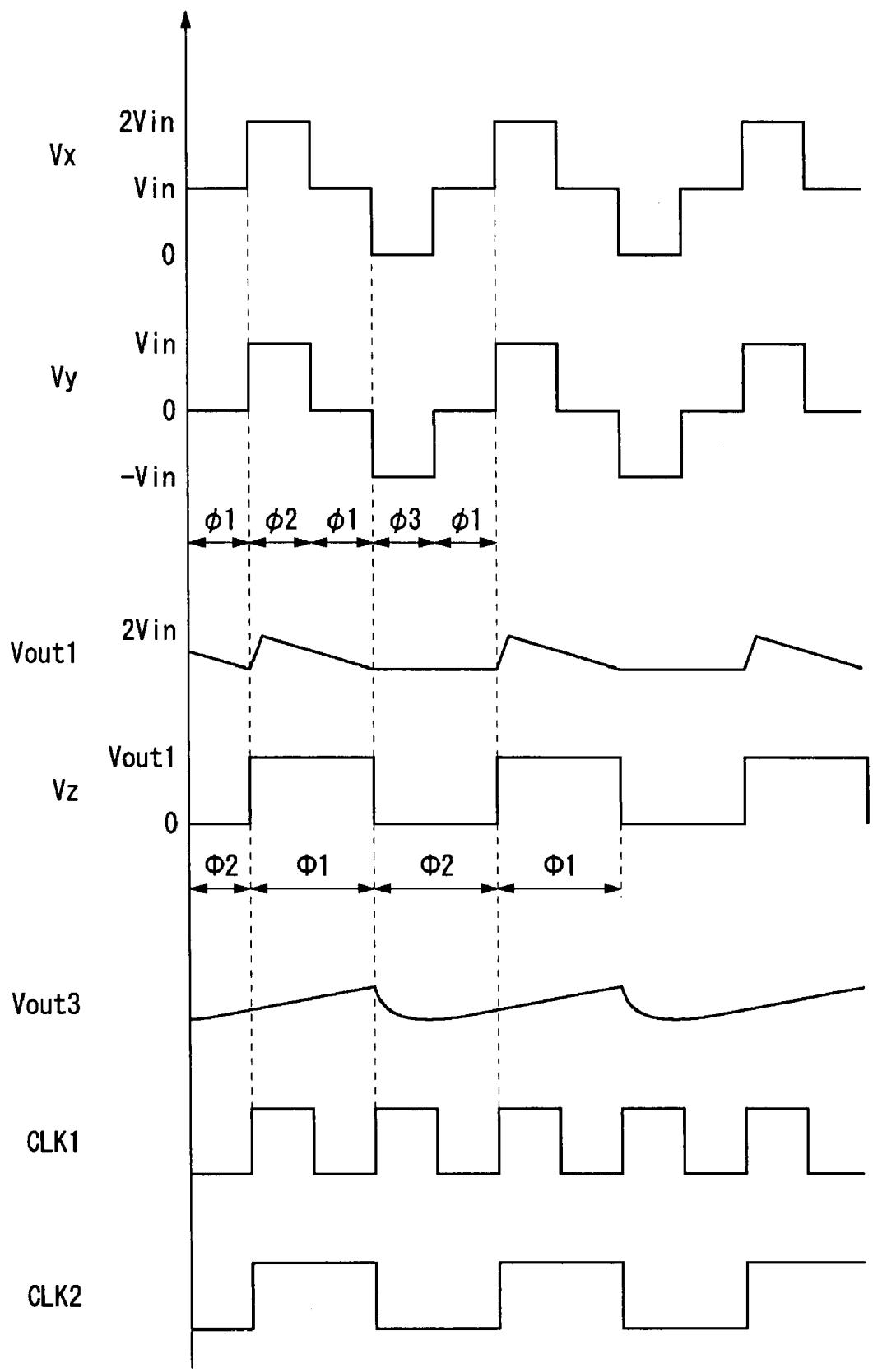
FIG. 6 is a time chart showing the operation state of the switching power supply apparatus shown in FIG. 5.

The operation of the switching power supply apparatus 400 which has the above-described configuration and is according to the present embodiment will be explained. FIG. 6 is a time chart showing the operation state of the switching power supply apparatus 400 shown in FIG. 5.

As explained in the first embodiment, the first charge pump circuit 410 performs switching operation according to the first clock signal CLK1 in a cyclic manner in which a first charging period φ1, a second charging period φ2, the first charging period φ1, and a third charging period φ3 are repeated in this order.

On the other hand, the second charge pump circuit 420 performs switching operation according to the second clock signal CLK2. The second charge pump circuit 420 is put into the first state Φ1 during the second charging period φ2 and the subsequent first charging period φ1 of the first charge pump circuit 410, wherein the second flying capacitor C2 is charged in the first state Φ1, and into the second state Φ2 during the third charging period φ3 and the subsequent first charging period φ1 of the first charge pump circuit 410, wherein the third output capacitor Co3 is charged in the second state Φ2.

According to the switching power supply apparatus 400 of the present embodiment, three voltages can be obtained for the input voltage Vin, that is, voltages 2Vin, −Vin, −2Vin can be obtained as the first output voltage Vout1, the second output voltage Vout2, and the third output voltage Vout3, respectively. Accordingly, in electronic equipment installed with the switching power supply apparatus 400, positive and negative power supply voltages of ±Vin and ±2Vin can be supplied to loads when the input voltage Vin is given.

In the switching power supply apparatus 400 according to the present embodiment, the switching frequency of the second charge pump circuit 420 is set half the switching frequency of the first charge pump circuit 410, and a phase in which the first output capacitor Co1 is charged in the first charge pump circuit 410, and a phase in which the second flying capacitor Cf2 is charged in the second charge pump circuit 420 are synchronously controlled. As a result, a change in the amount of charges stored in the first output capacitor Co1 may be suppressed, and the ripple of the first output voltage Vout1 may be reduced. Moreover, the fluctuations in the third output voltage Vout3, which is output from the second charge pump circuit 420, may be also suppressed by reduction in the ripple of the first output voltage Vout1 as the input voltage of the second charge pump circuit 420.

Here, the switching power supply apparatus 200 shown in FIG. 3 may be used as the first charge pump circuit 410 in the switching power supply apparatus 400 according to the present embodiment.

Fifth Embodiment

Figure 7:
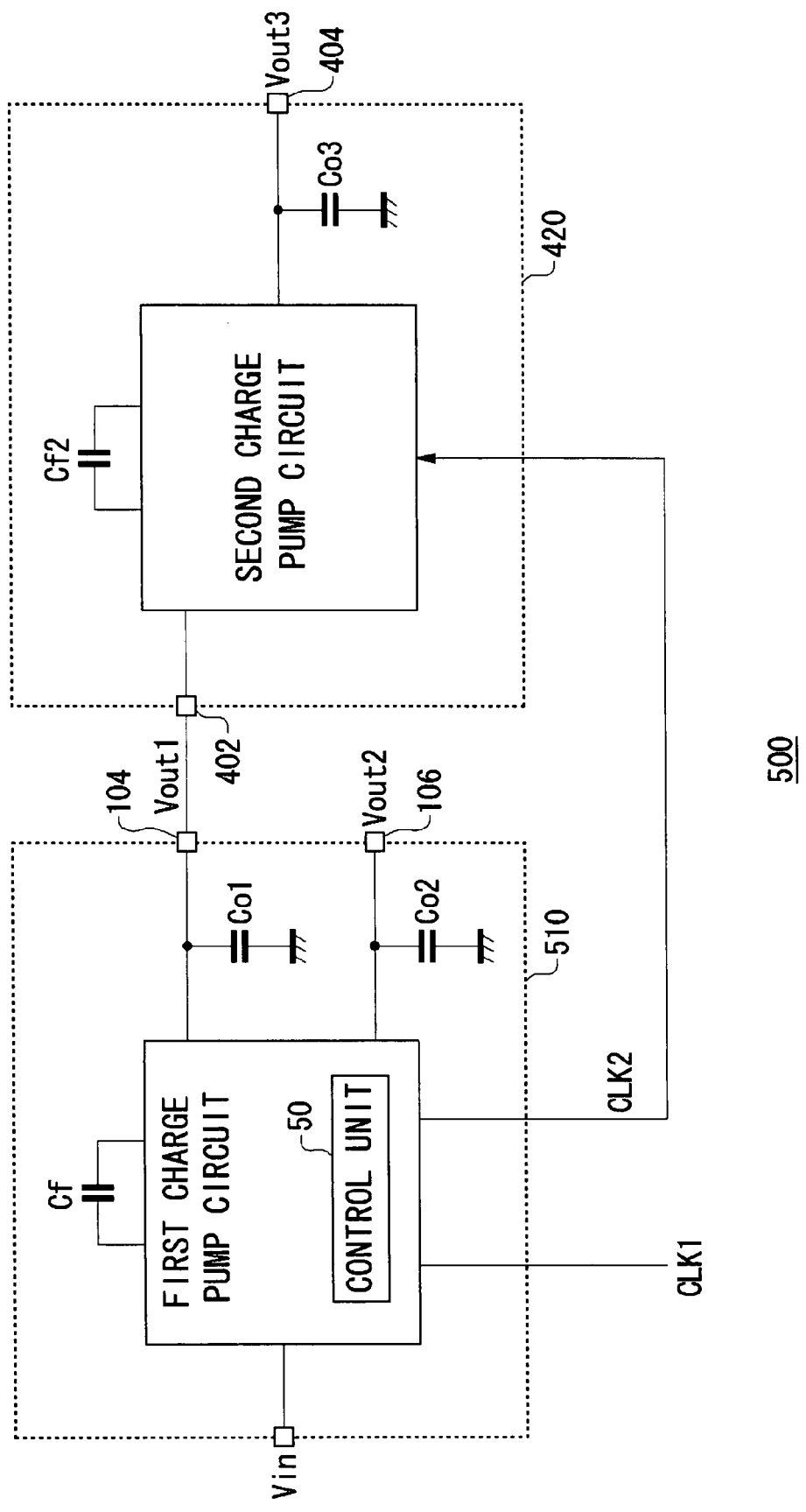
FIG. 7 is a circuit diagram showing a configuration of a switching power supply apparatus according to a fifth embodiment.

A fifth embodiment is a variant of the fourth embodiment. FIG. 7 is a circuit diagram showing a configuration of a switching power supply apparatus 500 according to the fifth embodiment. The switching power supply apparatus 500 according to the present embodiment is provided with a first charge pump circuit 510, and a second charge pump circuit 420. The configuration of the second charge pump circuit 420 is similar to the configuration shown in FIG. 5.

Figure 8:
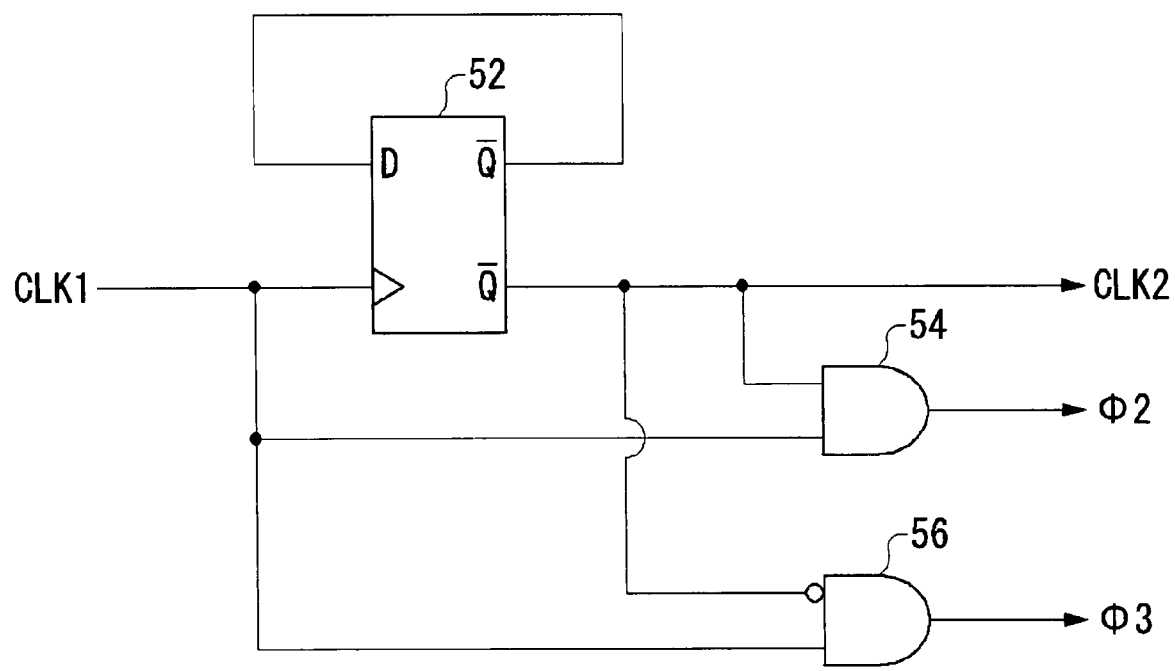
FIG. 8 is a circuit diagram showing a configuration of the control unit in the first charge pump circuit shown in FIG. 7.

The present embodiment is characterized in a configuration in which a second clock signal CLK2 input to the second charge pump circuit 420 is generated in the first charge pump circuit 510. FIG. 8 is a circuit diagram showing a configuration of a control unit 50 in the first charge pump circuit 510 shown in FIG. 7. The control unit 50 includes: a D latch circuit 52; a first AND gate 54; and a second AND gate 56.

A first clock signal CLK1 is input to a clock terminal in the D latch circuit 52, and a data terminal is connected to an inverting output terminal. The output signal of the D latch circuit 52 is output to the second charge pump circuit 420 as the second clock signal CLK2. The frequency of the second clock signal CLK2 output from the D latch circuit 52 becomes half that of the first clock signals CLK1.

The first AND gate 54 computes the AND of the first clock signal CLK1 and the second clock signal CLK2. When the output signal of the first AND gate 54 is at a high level, that is, when both of the first clock signal CLK1 and the second clock signal CLK2 are at a high level, the control unit 50 performs on-off control of the first switch SW1 through the sixth switch SW6 in such a way that the charging period is a second charging period φ2.

Moreover, the second AND gate 56 computes the AND of the first clock signal CLK1 and a signal obtained by inverting the second clock signal CLK2. When the output signal of the first AND gate 54 is at a high level, that is, when the first clock signal CLK1 is at a high level and the second clock signal CLK2 is at a low level, the control unit 50 performs on-off control of the first switch SW1 through the sixth switch SW6 in such a way that the charging period is a third charging period φ3.

Figure 9:
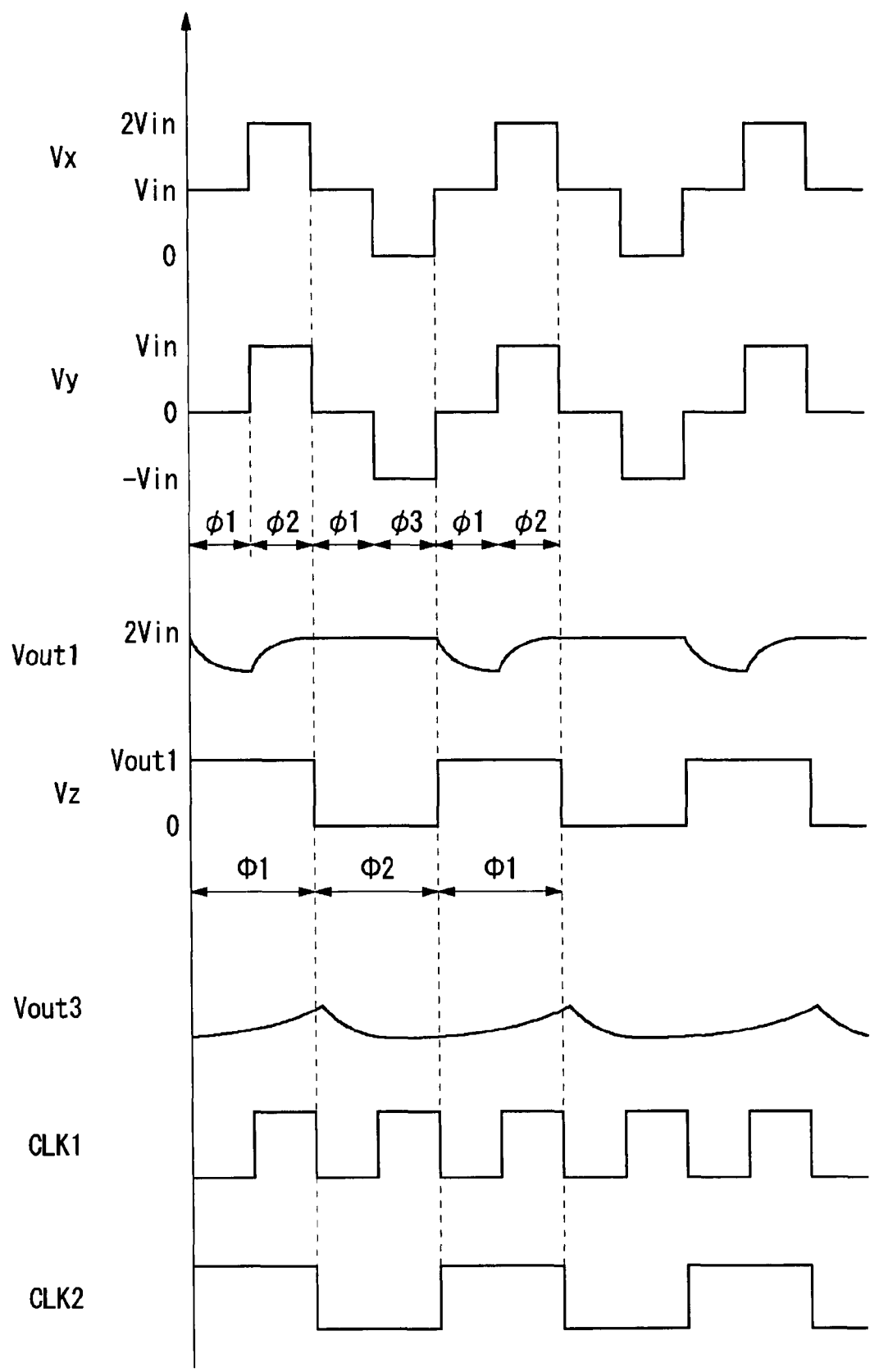
FIG. 9 is a time chart showing the operation state of the switching power supply apparatus shown in FIG. 7.

The operation of the switching power supply apparatus 500 which has the above-described configuration and is according to the fifth embodiment will be explained. FIG. 9 is a time chart showing the operation state of the switching power supply apparatus 500 shown in FIG. 7.

In the present embodiment, the first charge pump circuit 510 performs switching operation according to the first clock signal CLK1 in a cyclic manner in which a first charging period φ1, the second charging period φ2, the first charging period φ1, and the third charging period φ3 are repeated in this order.

On the other hand, the second charge pump circuit 420 charges a second flying capacitor Cf2 according to the second clock signal CLK2 during the first charging period φ1 and the subsequent charging period φ2, and at the same time, charges a third output capacitor Co3 during the first charging period φ1 and the subsequent third charging period φ3.

In the switching power supply apparatus 500 according to the present embodiment, the switching frequency of the second charge pump circuit 420 is set half the switching frequency of the first charge pump circuit 510, and a phase in which a first output capacitor Co1 is charged in the first charge pump circuit 510, and a phase in which the second flying capacitor Cf2 is charged in the second charge pump circuit 420 are synchronously controlled. As a result, a change in the amount of charges stored in the first output capacitor Co1 may be suppressed, and the ripple of a first output voltage Vout1 may be reduced. Furthermore, the fluctuations in a third output voltage Vout3, which is output from the second charge pump circuit 420, may be also suppressed by reduction in the ripple of the first output voltage Vout1 as the input voltage of the second charge pump circuit 420.

Here, the switching power supply apparatus 200 shown in FIG. 3 may be used as the first charge pump circuit 510 in the switching power supply apparatus 500 according to the present embodiment.

Figure 10:
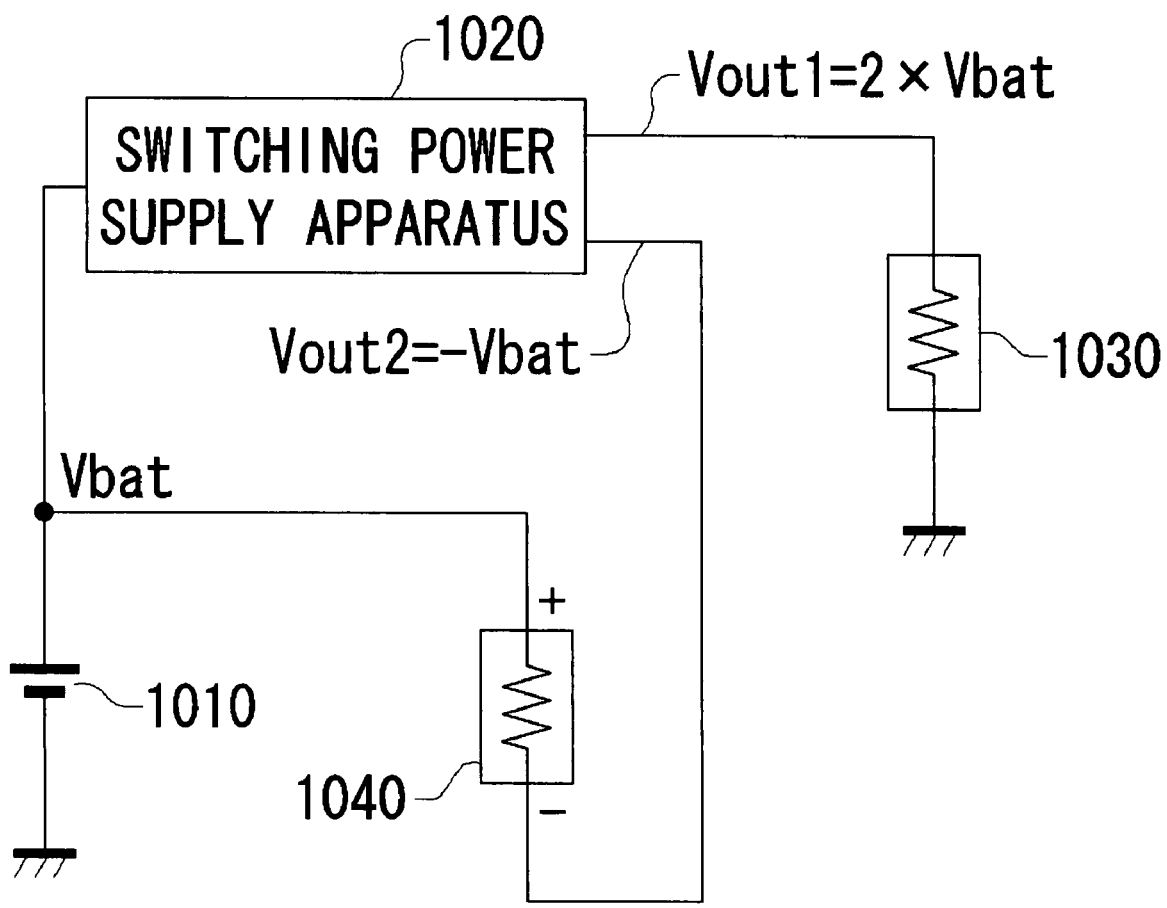
FIG. 10 is a block diagram showing a configuration of electronic equipment installed with a switching power supply apparatus according to the embodiments.

The switching power supply apparatuses according to the above-explained embodiments may be preferably used for electronic equipment such as a cellular telephone terminal of a battery driven type and a personal digital assistant (PDA). FIG. 10 is a block diagram showing a configuration of electronic equipment installed with a switching power supply apparatus according to the embodiments. Electronic equipment 1000 is provided with: a battery 1010; a switching power supply apparatus 1020; a first load 1030; and a second load 1040. The switching power supply apparatus 1020 is a switching power supply apparatus which has been explained in any one of the above described embodiments, and outputs a battery voltage Vbat output from the battery 1010 after conversion into a first output voltage Vout1 (=2×Vbat), and a second output voltage Vout2 (=−Vbat). The first output voltage Vout1 is supplied to the first load 1030 such as an LED and a liquid crystal panel. Moreover, the second output voltage Vout2 is supplied to the second load 1040 requiring a negative power supply.

It will be appreciated by persons skilled in the art that the above-described embodiments are to be considered as illustrative, and various modifications to the combinations of the components and the processes included in the above embodiments may be made within the scope of the present invention.

Another transistor such as a bipolar transistor may also substitute for the elements formed with MOSFETs in the above-described embodiments. Selection of the above substitution may be made, depending on the process and the cost for manufacturing the semiconductor, and the object required for the circuit.

Though the second charge pump circuits 420 of an inverting type have been explained in the above described embodiments, the present invention is not limited to the above type, and a charge pump circuit with a boosting rate of 1.5 or 2 times may be applied.

In the above-described embodiments, all of the elements forming the switching power supply apparatus 100 may be integrated on a single substrate, or may be formed into several separate integrated circuits. Furthermore, a part of the elements may be formed with discrete components. Which parts to be integrated depends on the cost, the occupied area, the object, and the like.

While the preferred embodiments of the present invention have been described using specific terms, such description is for illustrative purposes only, and it is to be understood that changes and variations may be made without departing from the spirit or scope of the appended claims.

The invention claimed is:

1. A switching power supply apparatus which generates and outputs two different voltages of a first and second output voltages from one input voltage, comprising:
   a flying capacitor;
   a first output capacitor which is provided between a first output terminal, from which said first output voltage is output, and a fixed potential terminal;
   a second output capacitor which is provided between a second output terminal, from which said second output voltage is output, and a fixed potential terminal;
   a first switch provided between one end of said flying capacitor and an input terminal to which said input voltage is applied;
   a second switch provided between the other end of said flying capacitor and said input terminal;
   a third switch provided between said one end of said flying capacitor and a fixed potential terminal;
   a fourth switch provided between said other end of said flying capacitor and a fixed potential terminal;
   a fifth switch provided between said one end of said flying capacitor and said first output terminal;
   a sixth switch provided between said other end of said flying capacitor and said second output terminal; and
   a control unit which performs on-off control of said first through said sixth switches,
   wherein
   said control unit divides time into:
   a first charging period in which said first switch and said fourth switch are turned on, and said flying capacitor is charged by said input voltage;
   a second charging period in which said second switch and said fifth switch are turned on, and a voltage approximately two times said input voltage is output from said first output terminal; and
   a third charging period in which said third switch and said sixth switch are turned on, and a voltage which is obtained by inverting said input voltage, is output from said second output terminal, and
   said charging periods are repeated.

2. The switching power supply apparatus according to claim 1, wherein
   said control unit performs on-off control of said first through said sixth switches in a cyclic manner in which said first charging period, said second charging period, said first charging period, and said third charging period are repeated in this order.

3. The switching power supply apparatus according to claim 1, further comprising:
   a control transistor which is provided between said first output terminal and one end of said flying capacitor, and is connected in series with said fifth switch; and
   an error amplifier by which an error between said first output voltage and a predetermined reference voltage is amplified, and said amplified error is applied to the control terminal of said control transistor.

4. The switching power supply apparatus according to claim 1, further comprising:
   a control transistor which is provided between said fixed potential terminal and one end of said flying capacitor, and is connected in series with said third switch; and
   an error amplifier by which an error between said second output voltage and a predetermined reference voltage is amplified, and said amplified error is applied to the control terminal of said control transistor.

* * * * *